Dec. 29, 1970      V. W. WEDDLE      3,551,804
METHOD AND APPARATUS FOR SONIC DETECTION OF OPEN
BREAKS IN OVERHEAD TELEPHONE CABLES
Filed Oct. 28, 1968
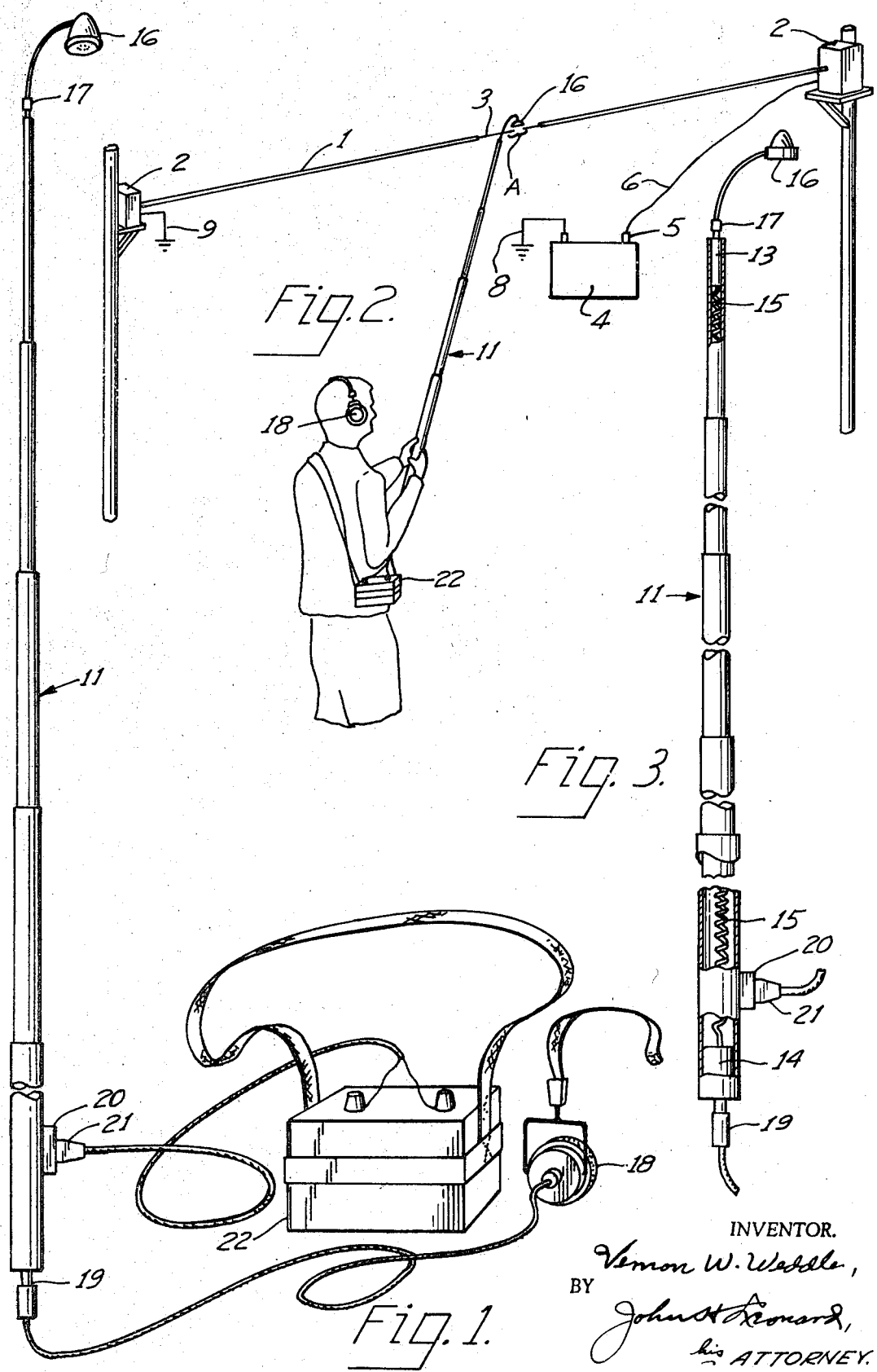
INVENTOR.
Vernon W. Weddle,
BY
John H. Leonard,
his ATTORNEY.

United States Patent Office 3,551,804
Patented Dec. 29, 1970

3,551,804
METHOD AND APPARATUS FOR SONIC DETECTION OF OPEN BREAKS IN OVERHEAD TELEPHONE CABLES
Vernon W. Weddle, Sunrise Trailer Court, Box 156, Warrenton, Mo. 63383
Filed Oct. 28, 1968, Ser. No. 770,970
Int. Cl. G01r 31/08
U.S. Cl. 324—52                                      5 Claims

ABSTRACT OF THE DISCLOSURE

A break in a wire of a sheathed multiwire cable is located by grounding one terminal of the selected wire and connecting to its other terminal the output terminal of an intermittent electrical spark producing device which then causes a succession of electric arcs to jump across the break. A telephonic transmitter mounted on an insulated pole operates a telephonic receiver carried by a workman. The transmitter is moved by the workman along the length of the cable being tested in close proximity to the exterior of the cable sheath. The maximum intensity of the receiver signal indicates to the workman when the transmitter is exactly alongside the arc.

---

This invention relates to a method and apparatus for locating breaks in insulated electrical conductors, and particularly in conductors of multiwire telephone cables, whether encased in metallic or other sheathing.

Heretofore trouble finders have been provided for locating short circuits and certain types of faults in such cables. Typical are those employing an exploring coil used in combination with an ordinary hand generator. Other fault finders include tone devices in which an oscillating current is transmitted through the wire and back to the tone device. A currently used device is one which indicates the distance to the fault from a selected measuring point as a percentage of the length of the wire under test. The device is a comparator of cable resistance or capacitance with an assumed norm per foot of wire. Thus, the accuracy depends upon correctness of the assumed norm per foot of wire, and this accuracy may be impaired also by a number of factors which can introduce errors into the readings; such, for example, as manufacturing variations in the wire of a given gauge, different extraneous conditions such as temperature and moisture, the cable sheathing, and even the quality of the connections of the locator itself to the wire.

In accordance with the present method, the applicant selects a wire to be tested. This can be done by the usual "sounding through" or "ringing through" devices connected to the wires at selected outlet boxes or stations distributed along the cable.

The distance between these outlet boxes ranges from about 400 to 500 yards. When a wire does not "sound through," a break is indicated, but the break may be at any location between the two outlet boxes. The break in the wire thus selected must then be located.

Instead of a tone producing device, a spark producing device is employed. One terminal of the selected wire is connected to the ground. The other terminal of the wire is connected to the output terminal of a sparking device. The device used is one which can produce a succession of high voltage arcs, for example, at about 12,000 volts, across an arc gap up to about ¼ of an inch. This rating is selected for economy and to reduce possibilities of damage to the wires, and having in mind that most breaks in cable wires are caused by lightning strokes and seldom exceed an eighth of an inch. A number of such spark producing devices are available on the market.

While producing a succession of arcs across the break in the selected wire, the cable is explored or scanned along its length by means of a device which is responsive to a phenomenon produced by the arcs. Preferably this phenomenon is the succession of sounds produced by the arcs. The scanning device in such case is a microphone or telephone transmitter which, as it is moved along the exterior of the cable in close proximity thereto, picks up the sound of the arc through the cable sheath and transmits it to a telephone receiver or head piece, which is connected to the transmitter in a low voltage battery energized circuit.

The strength of the signal produced by the transmitter is dependent upon the proximity of the transmitter to the arc and reaches its highest intensity when the transmitter is directly opposite the arc. The break can be located to within a quarter of an inch, merely by moving the transmitter back and forth after a break is generally located until a peak of sound intensity is produced by the receiver and the sound then starts to decrease. This sound can be picked up even though the wire is well insulated electrically and even though the cable is encased in a metallic or other sheathing.

Apparatus for carrying out the method is illustrated in the drawings, wherein:

FIG. 1 is a diagrammatic illustration of a cable and the break locator of the present invention in operating relation thereto;

FIG. 2 is an enlarged diagrammatic view showing a selected wire of the cable of FIG. 1, and the device for locating the break therein; and FIG. 3 is an enlarged view of the scanning device of the present invention, part thereof being shown in section for clearness in illustration.

Referring to the drawings, a cable 1 is illustrated, the cable being a multiwire cable the wires of which are insulated and enclosed in metal sheathing. At various locations long the length of the cable, the conventional outlet boxes or stations 2 are provided and at these boxes each wire 3 of the cable is exposed for electrical connections, as desired. A conventional "ring through" device is used to determine whether a wire is broken and this is done by connections to the wire at selected outlet boxes. In this manner the wires which do not ring through are selected for break location. In order to locate the break in a wire so selected, an arc producing device 4 is provided. The arc producing device 4 has an output terminal 5 which is connected by a lead wire 6 to the selected wire 3 at one outlet box. The other terminal of the arc producing device is connected to ground, as indicated at 8. At the next adjacent outlet box the wire 3 is connected to ground, as indicated at 9. Thus an arc can be produced across a break in the wire, as indicated at A.

The scanning or exploring device includes a pole 11 comprised of a plurality of hollow tubular sections secured together in telescopic relation for extension and retraction and so that the telescopic sections remain firmly in the extended condition selected, depending upon the height of the cable.

The upper end of the pole is provided with an electric socket 13. The lower end of the pole is provided with an electric socket 14. Each of these sockets has terminals connected to the terminals of a two-wire conductor cord 15. The conductor cord 15 is of the retractile telephone or communication cord type and is disposed within the pole and can extend and retract upon extension and retraction of the pole.

The scanning element of the device comprises, in the form illustrated, a microphone or telephone transmitter 16. This transmitter is connected to a jack 17 which, when received detachably in the socket 13, connects the terminals of the transmitter to the wires, respectively, of the conductor cord 15. Similarly the signal indicating element of the device comprises a telephonic receiver or earphone 18 of which the terminals are connected to a jack 19 which, when received in the socket 14, connects terminals of the receiver to the respective wires of the retractile conductor cord 15.

Mounted near the lower end of the pole is a plug-in socket 20 which detachably receives the terminals of a plug 21 and thereby connects an ordinary dry cell or storage battery 22 in series with the transmitter and receiver.

Preferably the connection between the transmitter 16 and the jack 17 is rigid or relatively stiff so that the jack 17 itself supports the transmitter in proper operating position on the pole 11.

In use the operator, walking on the ground beneath the cable, carries the battery on a shoulder strap and holds the receiver to his ear manually or by a head piece. He moves the transmitter along a path in close proximity to, but preferably spaced from, the exterior of the cable. The response of the transmitter to the sound of the arc is sufficiently clear and varies sufficiently in intensity as the transmitter approaches and recedes from the arc so that the operator can readily determine therefrom to within ¼ of an inch where the break exists.

Having thus described my invention, I claim:

1. A method of locating an open break in an ungrounded selected length of insulated telephone wire in a sheathed multiwire overhead telephone cable, which length extends between two cable outlet boxes and has connecting terminals exposed in the boxes, respectively, and comprising:

grounding one of said terminals;

applying to the other of said terminals successively interrupted high electrical potential so as to cause directly across the open break from the portion of said selected length at one side of the break to the portion of said selected length of wire at the other side of the break, while said selected length is ungrounded except at said one terminal, a succession of separate and distinct electric sparks separated from each other by short intervals of time;

passing along the exterior of the sheath of the overhead cable in close proximity thereto a scanning element of a signal device which element is vibrated by sound waves exteriorly of the sheath, produced by the sparks within the sheath, when the element is in close proximity to the sparks and thereby causes the device to produce signals responsive to the sound vibrations produced by the sparks across the open break, respectively, and of which signals the intensity varies in predetermined relation to the proximity of the element to the sparks; and while the scanning element is being so passed, maintaining it spaced above and insulated electrically from the ground.

2. A testing device for locating an open break in an ungrounded selected length of insulated wire in an overhead sheathed multiwire telephone cable, which length extends between two cable outlet boxes and has connecting terminals exposed in the boxes, respectively, and comprising:

means adapted for connecting one of said terminals of the selected length of wire at one side of the break to ground;

means adapted for connection to the other of said terminals and operable when so connected, to apply to said other terminal at the other side of the break successively interrupted high electrical potential so as to cause directly across the open break from the portion of said selected length at one side of the break to the portion of said selected length of wire at the other side of the break, while said selected length is ungrounded except at said one terminal, a succession of distinct and separate electrical sparks separated from each other by short intervals of time;

a signaling device including a scanning element having a transmitter which is vibratable by sound waves exteriorly of the sheath produced by the sparks within the sheath when the element is in close proximity to the spark, and thereby is operable to cause the device to produce signals in response to the sound vibrations produced by the sparks across the open break, respectively, and of which signals the intensity varies in predetermined relation to the proximity of the element to the sparks;

a receiver connected to the transmitter and responsive to the signals produced thereby;

an elongated insulated pole connected at one end to the said element of the device and adapted, when held by a workman standing on the ground beneath the cable, to support the element and to manipulate it along a path close to the exterior of the cable sheath and spaced about the ground while insulating the element electrically from the ground;

characterized in that:

said pole has a plurality of elongated hollow open end sections telescopically connected to each other so that the pole is extensible and contractible endwise;

a retractile two-wire communication cord is disposed in the pole and extends endwise thereof;

the transmitter is connected to the terminals of the wires at one end of the pole;

the receiver is connected to the terminals of the wires at the other end of the pole; and battery connecting means are provided for detachably connecting a battery to said wires in series with the transmitter and receiver.

3. The structure according to claim 2 wherein the connection between the transmitter and the terminals of the wires at said outer end of said one section comprises a socket carried by the pole at said outer end of said one section and connected to the terminals of said wires at said one end; and a terminal jack is connected to the transmitter and is detachably received in said socket.

4. The structure according to claim 8 wherein the jack and transmitter are fixedly connected to each other so that the jack supports the transmitter in fixed position relative to the pole.

5. The structure according to claim 2 wherein the connection between the other terminals of the wires and the receiver comprise a second socket at the outer end of the other section of the pole and connected to the terminals of said wires;

a second terminal jack is electrically connected to the receiver and is detachably connected to the second socket for connecting the receiver in said circuit; and the battery connecting means are a detachable plug-in receptacle near said outer end of said other end section of the pole and is connected to said wires, and a plug for connecting the battery in said circuit in series with the transmitter and receiver through said receptacle.

References Cited

UNITED STATES PATENTS

| | | | |
|---|---|---|---|
| 2,291,533 | 7/1942 | Cummings | 324—52X |
| 2,698,921 | 1/1955 | Wharton | 324—52 |
| 2,581,129 | 1/1952 | Muldoon | 324—53UX |
| 2,890,408 | 6/1959 | Perkins | 324—52 |
| 3,345,560 | 10/1967 | Perkins | 324—52 |
| 1,745,419 | 2/1930 | Henneberger | 324—52X |
| 2,852,737 | 9/1958 | Wheeler | 324—51 |

OTHER REFERENCES

Benson et al.: Buried Cable Faults Located by Sonic Detector, Electrical World, June 22, 1946, pp. 82–85.

Bechtel, C. B.: Ground Vibrations Pin Point Faults, Electrical World, Feb. 21, 1955, pp. 114, 187 and 188.

G. R. STRECKER, Primary Examiner